(12) United States Patent
Nakashima et al.

(10) Patent No.: US 6,318,743 B1
(45) Date of Patent: Nov. 20, 2001

(54) MOTORCYCLE

(75) Inventors: Tai Nakashima; Noriyoshi Tsutsui, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/654,563

(22) Filed: Sep. 1, 2000

(30) Foreign Application Priority Data

Sep. 1, 1999 (JP) ................................................. 11-247749

(51) Int. Cl.$^7$ ................................................. B62D 25/16
(52) U.S. Cl. ........................ 280/152.1; 180/219; 293/105
(58) Field of Search ........................... 180/219; 293/105, 293/106; 280/160, 160.1, 152.1, 152.2, 152.3

(56) References Cited

U.S. PATENT DOCUMENTS

| | | | |
|---|---|---|---|
| 4,460,057 | * 7/1984 | Kohyama | 180/210 |
| 4,500,101 | * 2/1985 | Aoki | 180/219 |
| 4,577,719 | * 3/1986 | Nomura et al. | 180/219 |
| 6,257,362 | * 7/2001 | Scherbarth | 180/219 |

FOREIGN PATENT DOCUMENTS 2534475   6/1996   (JP).

* cited by examiner

Primary Examiner—Kevin Hurley
(74) Attorney, Agent, or Firm—Birch, Stewart, Kolasch & Birch, LLP (57) ABSTRACT

A motorcycle in which a rear fender for covering a rear wheel is mounted on a rear frame including a pair of right and left seat rails for supporting a rider's seat, and a battery is contained in a portion, covered with the seat, of the rear fender, includes the wiring of a wire harness without exerting any effect on the width and height of the seat. A rear fender integrally includes a pair of right and left side plates and a bottom plate for connecting lower ends of the side plates to each other, and a battery containing portion for containing a battery is formed in the rear fender in such a manner so as to be spaced inwardly from the side plates. A pair of right and left wiring grooves are formed in the rear fender at positions between the battery containing portion and the side plates in such a manner as to be covered, from above, with portions of seat rails disposed between the battery containing portion and the side plates. Wire harnesses are led from front end opening portions of wiring grooves to the outside of the rear fender through the wiring grooves.

16 Claims, 7 Drawing Sheets

FIG. 7

MOTORCYCLE

BACKGROUND OF THE INVENTION

1. Field of the Invention

The present invention relates to a motorcycle in which a rear fender for covering a rear wheel is mounted on a rear frame including a pair of right and left seat rails for supporting a rider's seat, and a battery is contained in a portion, covered with the seat, of the rear fender.

2. Description of Background Art

The motorcycle of the type described above is set forth in Japanese Patent No. 2534475.

A wire harness connected to a rear lamp disposed at the rear end of a motorcycle is wired almost over the overall length of the motorcycle, and according to the above-described prior art motorcycle, since seat rails are disposed on both sides of a rear fender, a wire harness wiring space is required between a battery and side plates of the rear fender or between the side plates of the rear fender and seat rails, or to be provided over the rear fender. Such a wire harness wiring structure, however, exerts an effect on the width and height of a seat supported by the seat rails.

SUMMARY AND OBJECTS OF THE INVENTION

In view of the foregoing, the present invention has been made, and an object of the present invention is to provide a motorcycle capable of wiring a wire harness without exerting any effect on the width and height of a seat.

To solve the above object, according to the present invention, there is provided a motorcycle in which a rear fender for covering a rear wheel is mounted on a rear frame including a pair of right and left seat rails for supporting a rider's seat, and a battery is contained in a portion, covered with the seat, of the rear fender, wherein the rear fender integrally includes a pair of right and left side plates and a bottom plate for connecting lower ends of the side plates to each other. A battery containing portion for containing the battery is formed in the rear fender in such a manner as to be spaced inwardly from the side plates. A pair of right and left wiring grooves are formed in the rear fender at positions between the battery containing portion and the side plates in such a manner as to be covered, from above, with portions of the seat rails disposed between the battery containing portion and the side plates. Wire harnesses are led from front end opening portions of the wiring grooves to the outside of the rear fender through the wiring grooves.

With this configuration, since portions of the seat rails are disposed in the rear fender on both sides of the battery containing portion and the wire harnesses pass under the seat rails in the rear fender, the wiring of the wire harness extending to the rear end of the motorcycle does not exert any effect on the gap between the seat rails and also a wire harness wiring space is not required to be formed over the seat rails. As a result, the wire harnesses can be wired without exerting any effect on the width and height of the seat.

According to the present invention, an ECU containing portion for containing an electronic control unit for engine control is formed in the rear fender at the front of the battery containing portion. With this configuration, an ECU wire harness to be connected to the electronic control unit is made as short as possible, and further, since it is not required to wire the ECU wire harness while avoiding the battery under the seat, it is possible to make narrow the width of the vehicular body under the seat and to lower the height of the seat.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, one embodiment of the present invention will be described with reference to the accompanying drawings.

Figure 1:
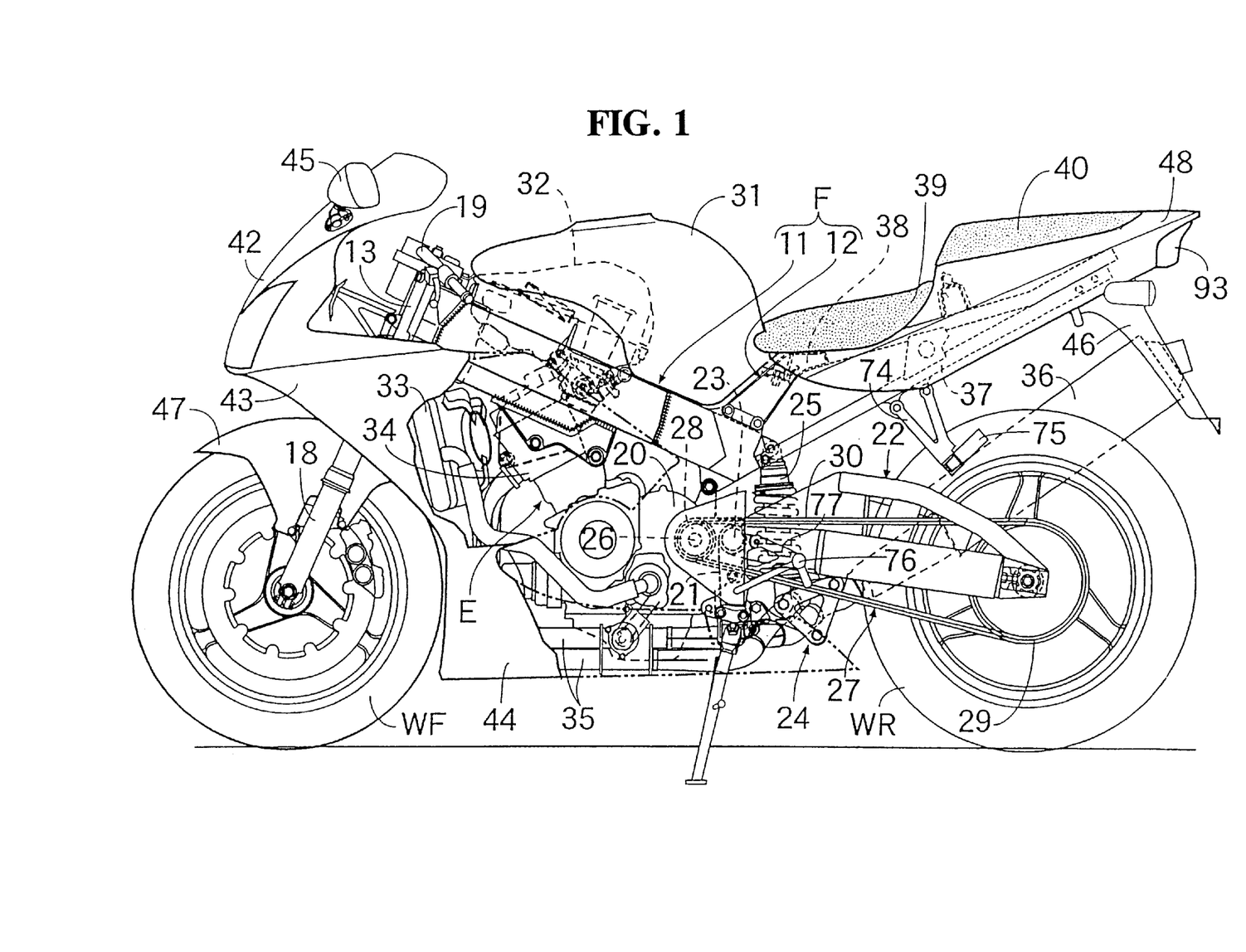
FIG. 1 is a side view of a motorcycle.

FIGS. 1 to 7 illustrate an embodiment of the present invention, wherein FIG. 1, shows a body frame F of a motorcycle that includes a front frame 11 on which an engine E is mounted, and a rear frame 12 connected to a rear end portion of the front frame 11. A head pipe 13 is provided at a front end of the front frame 11, and a front fork 18 for rotatably supporting a front wheel WF is steerably supported by the head pipe 13. A handlebar 19 is connected to an upper end of the front fork 18.

The engine E is of a multi-cylinder type in which a plurality of cylinders, for example, four cylinders, are disposed in parallel along the width direction of the body frame F. The engine E is supported by the front frame 11. An arm supporting member 21 is supported by a rear portion of a crank case 20 of the engine E. A front end portion of a rear swing arm 22 for rotatably supporting a rear wheel WR is swingably supported by the arm supporting member 21 via a supporting shaft 23. A link mechanism 24 is provided between the arm supporting member 21 and the rear swing arm 22. A rear cushion unit 25 is provided between the link mechanism 24 and the rear portion of the front frame 11.

Power from an output shaft 26 of a transmission contained in the engine E is transmitted to the rear wheel WR via chain transmission means 27. The chain transmission means 27 includes a drive sprocket 28 fixed to the output shaft 26, a driven sprocket 29 fixed to the rear wheel WR, and an endless chain 30 wound around the sprockets 28 and 29. The chain transmission means 27 is disposed on the left side of the engine E as seen in the direction of forward movement of the motorcycle.

A fuel tank 31 supported by the front frame 11 and a front portion of the rear frame 12 is disposed over the engine E. An air cleaner 32 is disposed between the fuel tank 31 and the engine E, and a radiator 33 is disposed in front of the engine E.

A plurality of exhaust pipes, for example, four exhaust pipes 35, are connected to a cylinder head 34 of the engine E to project from the front side of the engine E to curve under the engine E, and extend to the right side of the rear wheel WR. The exhaust pipes 35 are finally connected to an exhaust muffler 36 disposed on the right side of the rear wheel WR.

The rear frame 12 includes a pair of right and left rear stays 37 which extend rearwardly, upwardly from a rear end of the front frame 11, and a pair of right and left seat rails 38 which extend rearwardly, upwardly from the rear end of the front frame 11 while passing over the rear stays 37 and are connected to rear ends of the rear stays 37. A main seat 39 on which a rider sits is supported by the seat rails 38 at a position behind the fuel tank 31, and a pillion seat 40 on which a passenger is to be sit is supported by the seat rails 38 at a position separated rearwardly from the main seat 39.

The front side of the head pipe 13 provided at the front frame 11 is covered with a synthetic resin made front cowl 42. Both sides of a front portion of the vehicular body are covered with a synthetic resin made center cowl 43 continuous to the front cowl 42. Both sides of a portion, disposed under the engine E, of each of the exhaust pipes 35 are covered with a synthetic resin made lower cowl 44 continuous to the center cowl 43. Rear view mirrors 45 are mounted on the right and left sides of an upper portion of the front cowl 42.

A rear fender 46 for covering the upper side of the rear wheel WR is mounted to the rear frame 12, and a front fender 47 for covering the upper side of the front wheel WF is mounted to the front fork 18. The rear frame 12 and the rear fender 46 are covered with a rear cowl 48.

Figure 2:
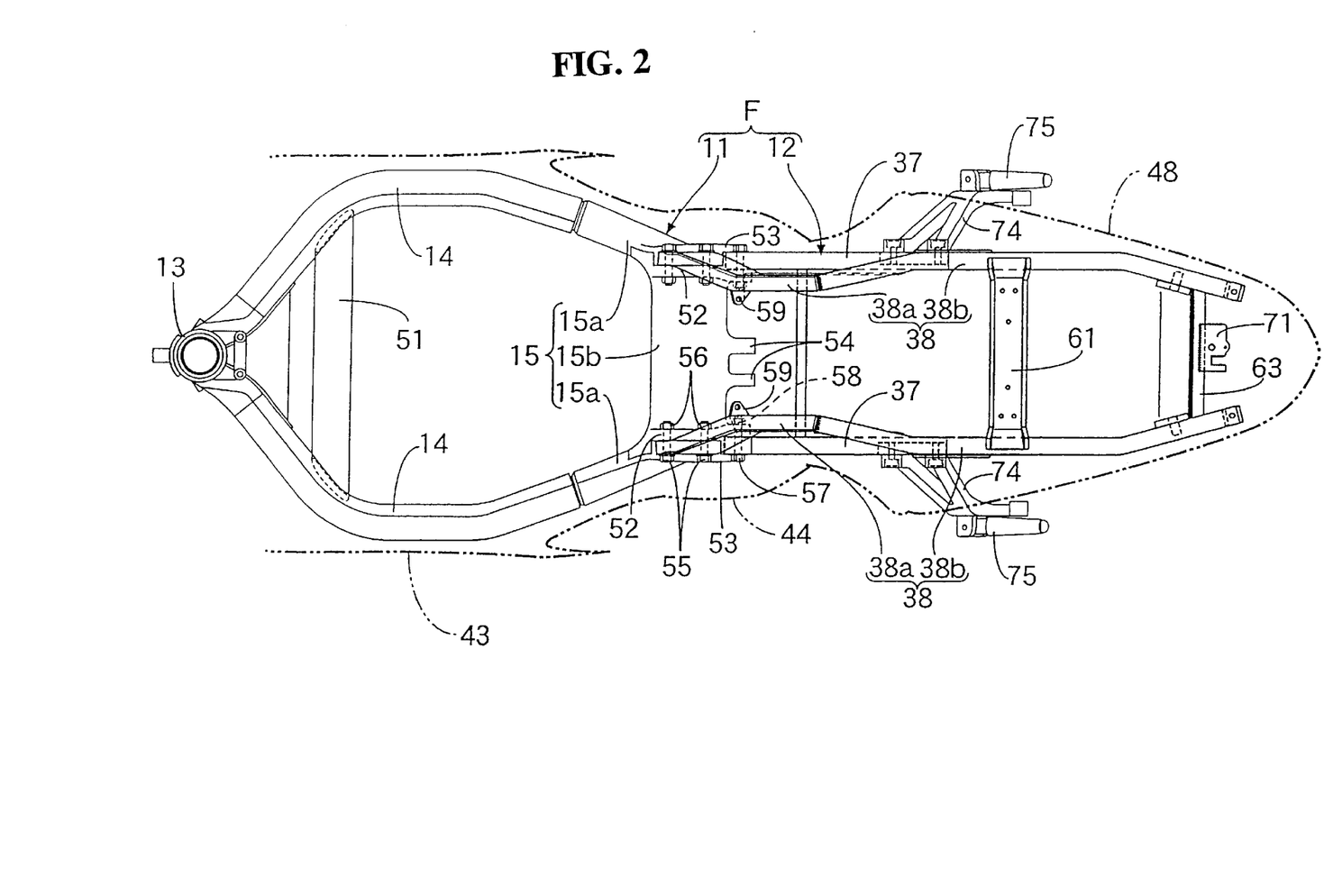
FIG. 2 is a plan view of a body frame.

Referring to FIG. 2, the front frame 11 includes the head pipe 13, a pair of right and left main frames 14 extending rearwardly, downwardly from the head pipe 13, and a bracket 15 for connecting rear ends of the main frames 14 to each other. A supporting stay 51 for supporting the air cleaner 32 is provided between front portions of the main frames 14. The supporting stay 51 serves as a cross-member for reinforcing the main frames 14.

The main frame 14 is formed from an ingot of an aluminum alloy or the like into a hollow square shape by a known extrusion process. The main frames 14, which have been formed by extrusion, are bent in such a manner that longitudinal intermediate portions of the main frames 14 project outwardly.

The bracket 15 integrally includes a pair of frame side portions 15a disposed over a front end portion of the rear swing arm 22 for rotatably supporting the rear wheel WR and welded to the rear ends of the main frames 14, and a single cross-pipe 15b for connecting both the frame side portions 15a to each other. The bracket 15 is formed from an aluminum alloy or the like into an approximately U-shape in a plan view by casting.

Plates 52, on which front end portions of the seat rails 38 of the rear frame 12 are to be mounted and fastened, are integrally provided on both the frame side portions 15a of the rear end portion of the front frame 11, that is, the bracket 15 in such a manner as to project upwardly therefrom. Plates 53, on which front end portions of the rear stays 37 of the rear frame 12 are to be mounted and fastened, are integrally provided on both the frame side portions 15a of the bracket 15 in such a manner as to project rearwardly therefrom.

A pair of connection plate portions 54 to be connected to an upper end portion of the rear cushion unit 25 are integrally provided on the cross-pipe portion 15b of the bracket 15 in such a manner as to project rearwardly therefrom.

Figure 3:
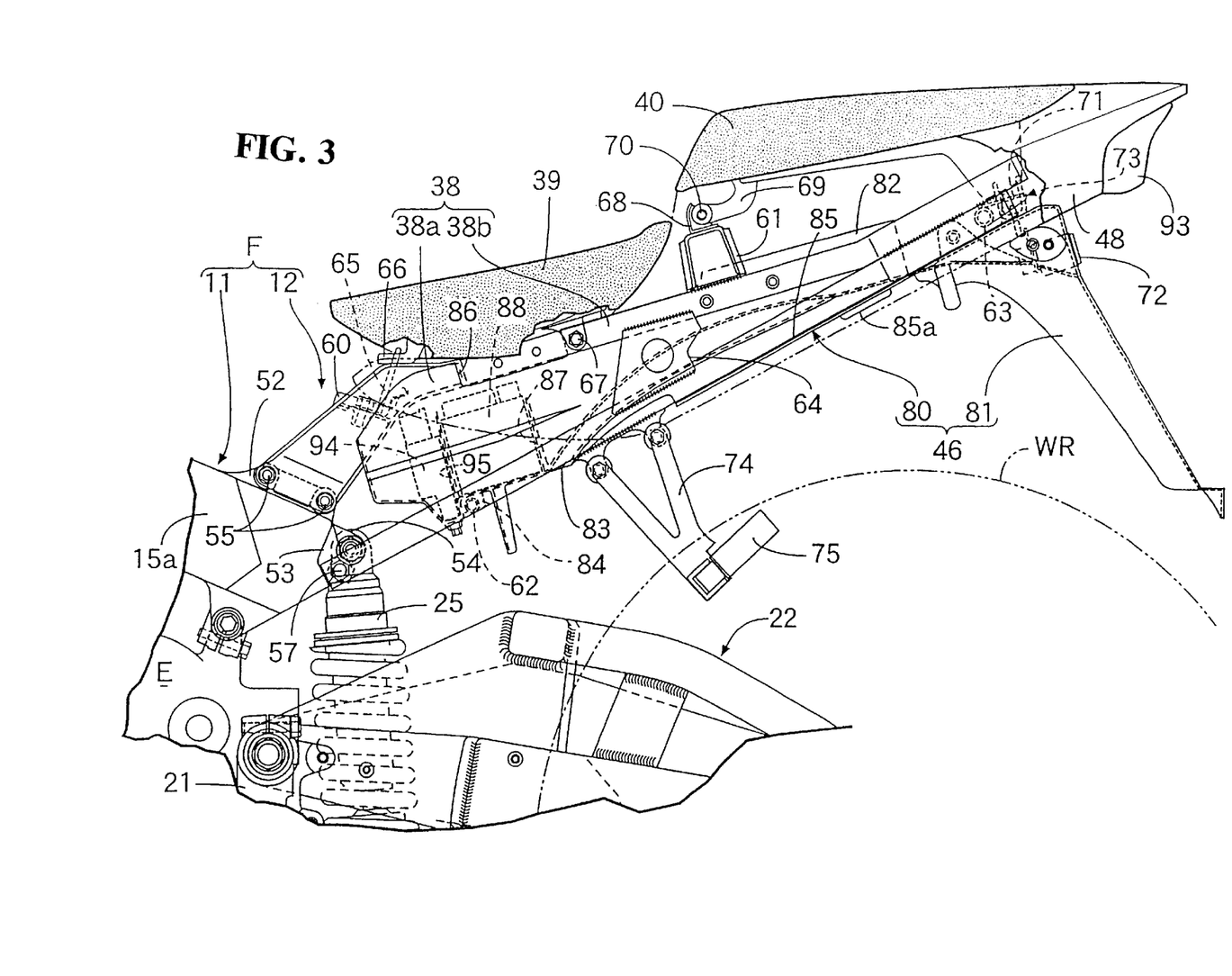
FIG. 3 is an enlarged side view of a rear portion of the motorcycle.
Figure 4:
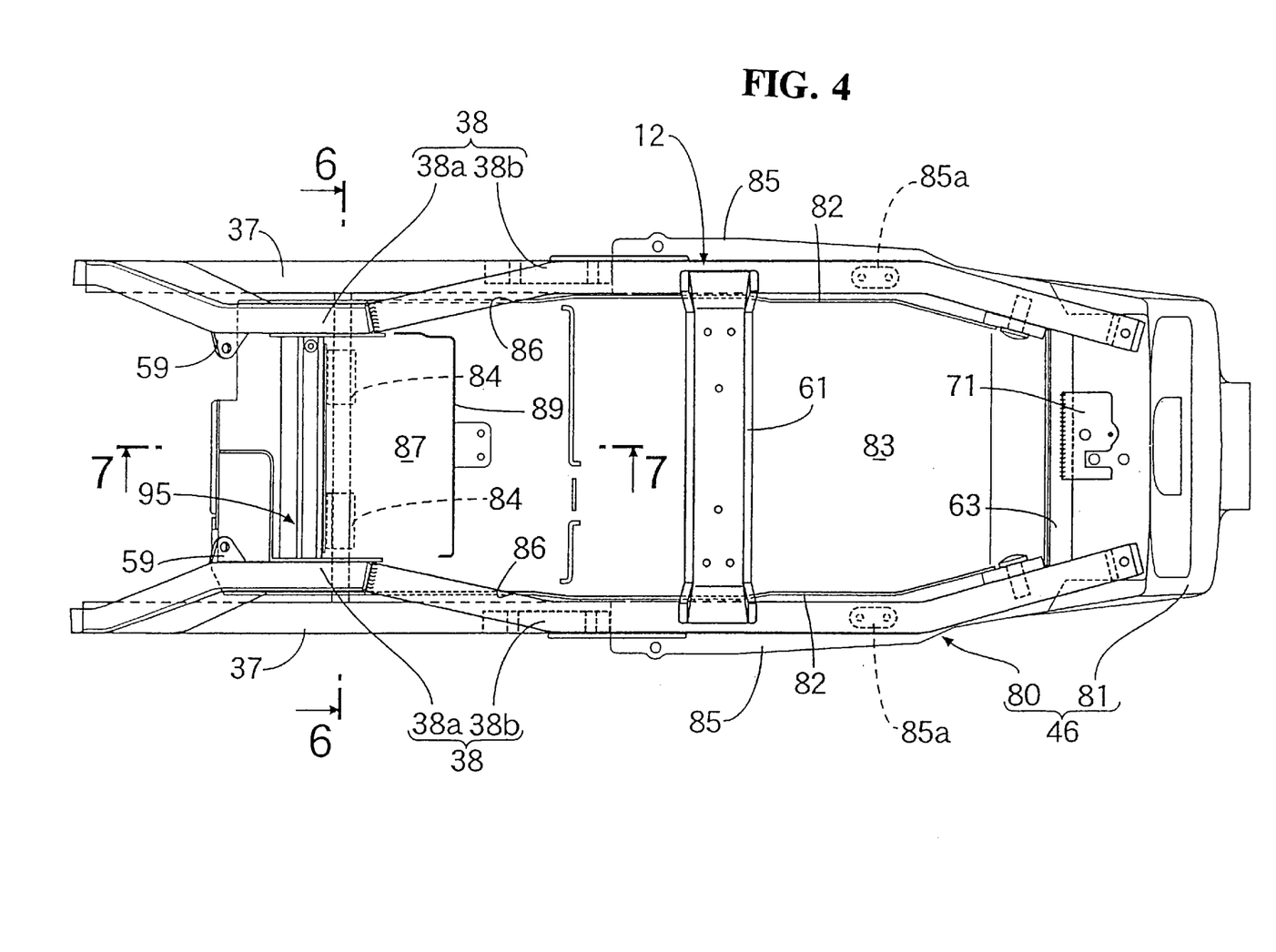
FIG. 4 is an enlarged plan view of a rear frame and a rear fender.

Referring to FIGS. 3 and 4, each of the seat rails 38 includes a mounting plate 38a having a flat-shape in a side view and extending rearwardly, upwardly, and a pipe 38b extending rearwardly, upwardly from the rear end of the mounting plate 38a. The pipe 38b tilts more gently than the mounting portion 38a does. The front ends of the mounting plates 38a are fastened to the plates 52 at the rear ends of the front frames 11 by means of a pair of bolts 55 and a pair of nuts 56. That is to say, the front ends of the mounting plates 38a are removably connected to the rear ends of the front frames 11.

The mounting plate 38a is formed from an aluminum alloy or the like by casting, and the pipe 38b is formed from an aluminum alloy or the like into a shape having a square shape in cross-section by extrusion. The front end of the pipe 38b is welded to the rear end of the mounting plate 38a.

A rear end portion, corresponding to the rider's main seat 39, of the mounting plate 38a is, as shown in FIG. 4, bent inwardly from the rear stay 37 in a plan view. Accordingly, the rear end portion of the mounting plate 38a and a front end portion of the pipe 38b are bent inwardly in the width direction of the vehicular body. In other words, a gap between the seat rails 38 at a position corresponding to the main seat 39 is narrower. Rear end portions of the seat rails 38, that is, rear end portions of the pipes 38b are bent in such a manner that a gap therebetween becomes narrower toward the rear side.

The rear stay 37 is formed from an aluminum alloy or the like into a pipe having a square shape in cross-section by extrusion. The front end of the rear stay 37 extending in a straight-line in a side view in such a manner as to rearwardly, upwardly tilt more sharply than the pipe 38b of the seat rail 38 does is fastened to the plate 53 at the rear end of the front frame 11 by means of a bolt 57 and a nut 58.

Rear end portions of the rear stays 37 are disposed under rear end portions of the seat rails 38 and are bent in such a manner that a gap therebetween becomes narrower toward the rear side. The rear end portions of the seat rails 38 are welded to upper surfaces of the rear end portions of the rear stays 37. Accordingly, the rear end portions of the rear frames 12 are formed such that the width therebetween becomes narrower toward the rear side.

Receiving plates 59 are integrally provided on the inner surfaces of intermediate portions of the mounting plates 38a of the seat rails 38 in such a manner as to project therefrom. Both ends of a first supporting plate 60 placed between the mounting plates 38a are fastened to the receiving plates 59. Both ends of a second supporting plate 61, which is placed in such a manner as to be raised upwardly from the seat rails 38, are welded to upper surfaces of intermediate portions of the pipes 38b of the seat rails 38. A first cross-pipe 62 is provided between portions, near the front ends, of the rear stays 37. A second cross-pipe 63 is provided between rear end portions of the rear stays 37. Intermediate portions of the seat rails 38 are connected to intermediate portions of the rear stays 37 by means of connection plates 64.

A front portion of the rider's main seat 39 is placed on rear end portions of the mounting plates 38a of the seat rails 38 via an elastic member (not shown). An engagement member 65 is fixed to the first supporting plate 60 provided between the front portions of the seat rails 38. An engagement piece 66 extending forwardly from the lower end of the front portion of the main seat 39 is engaged, from below, to the engagement member 65. The rear portion of the main seat 39 is placed on the front end portions of the pipes 38b and fastened to the pipes 38b with bolts 67. That is to say, the main seat 39 is fixed to the seat rails 38 by fastening the bolts 67, and can be removed from the seat rails 38 by loosening the bolts 67.

A bearing member 68 is fixed to the second supporting plate 61 provided between the intermediate portions of the pipes 38b. A front end portion of an arm 69, which is provided on a lower portion of a pillion seat 40 for allowing a passenger to sit thereon and which extends forwardly therefrom, is turnably connected to the bearing member 68 via a shaft 70. On the other hand, a seat supporting plate 71 for receiving a lower portion of the rear end of the pillion seat 40 is fixed to the second cross-pipe 63 for connecting the rear end portions of the rear stays 37 to each other. A lock mechanism 73, which can be switched between a locking state and an unlocking state by operation of a cylinder key 72 provided at the rear end of the rear fender 46, is provided between the supporting plate 71 and the pillion seat 40. In the unlocking state of the lock mechanism 73, the pillion seat 40 can be turned with its rear portion moved upwardly.

Two holders 74 are fastened to intermediate portions of both the pipes 38b, and steps 75 on which the feet of a passenger sitting on the pillion seat 40 are positioned. The steps 75 are foldably supported by the holders 74. On the other hand, right and left steps 76 (see FIG. 1) on which the feet of a rider sitting on the main seat 39 are to be rested are supported by a pair of right and left holders 77 (see FIG. 1) fastened to the arm supporting member 21.

Figure 5:
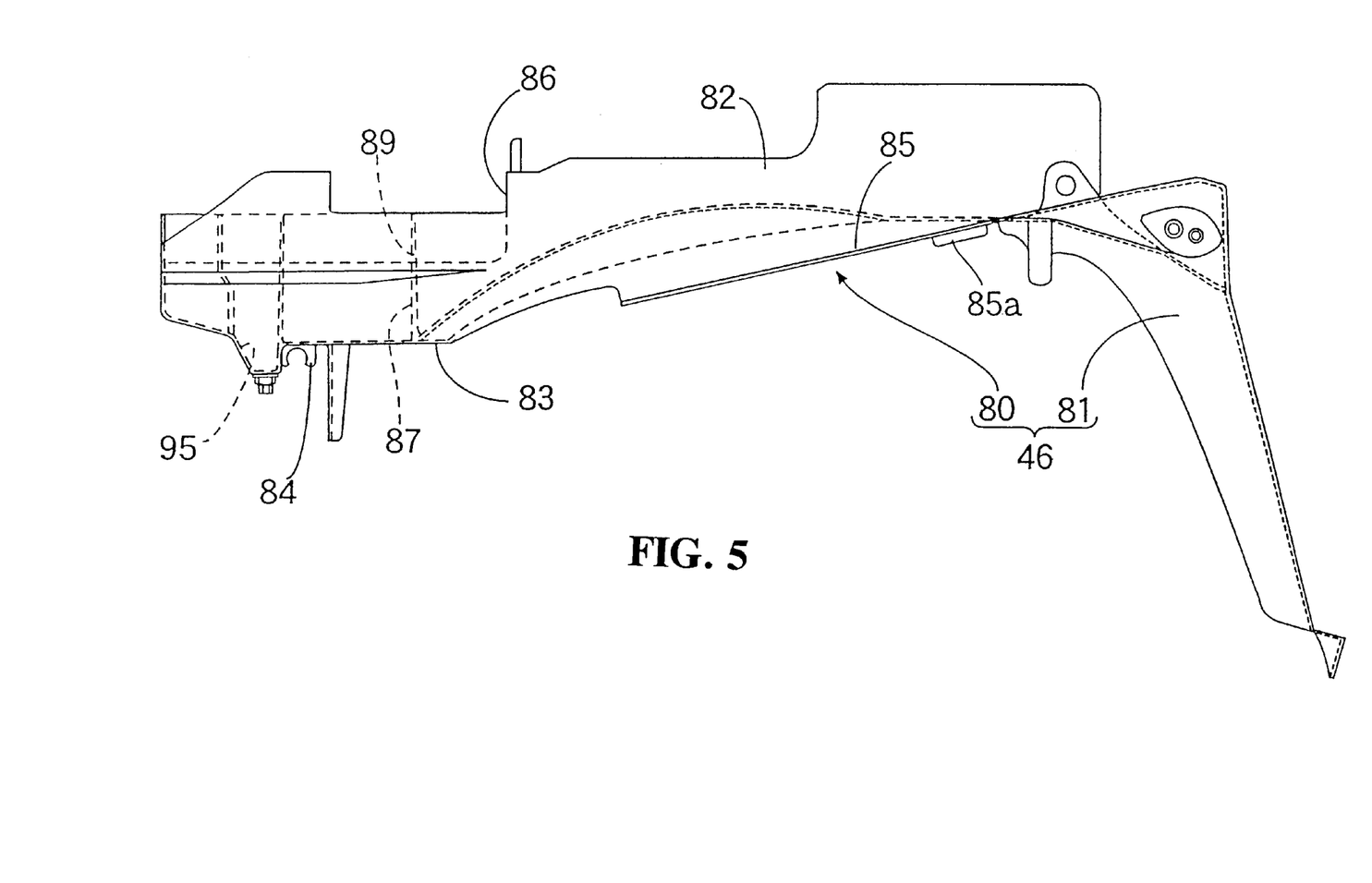
FIG. 5 is a side view of the rear fender.
Figure 6:
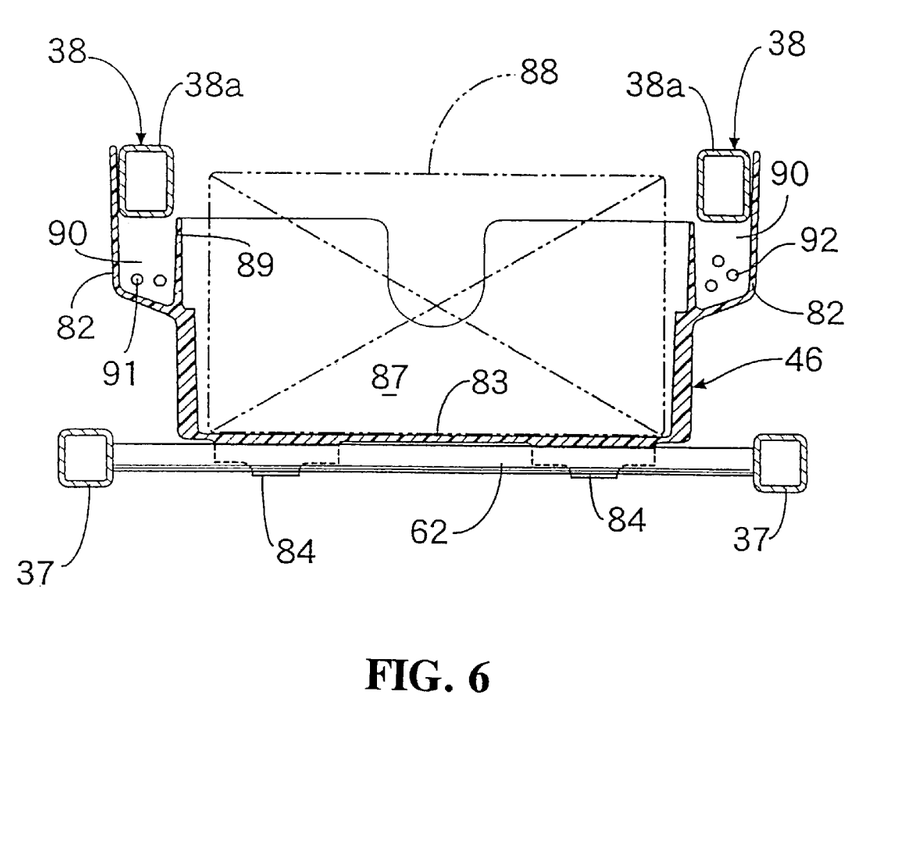
FIG. 6 is sectional view taken on line 6—6 of FIG. 4.
Figure 7:
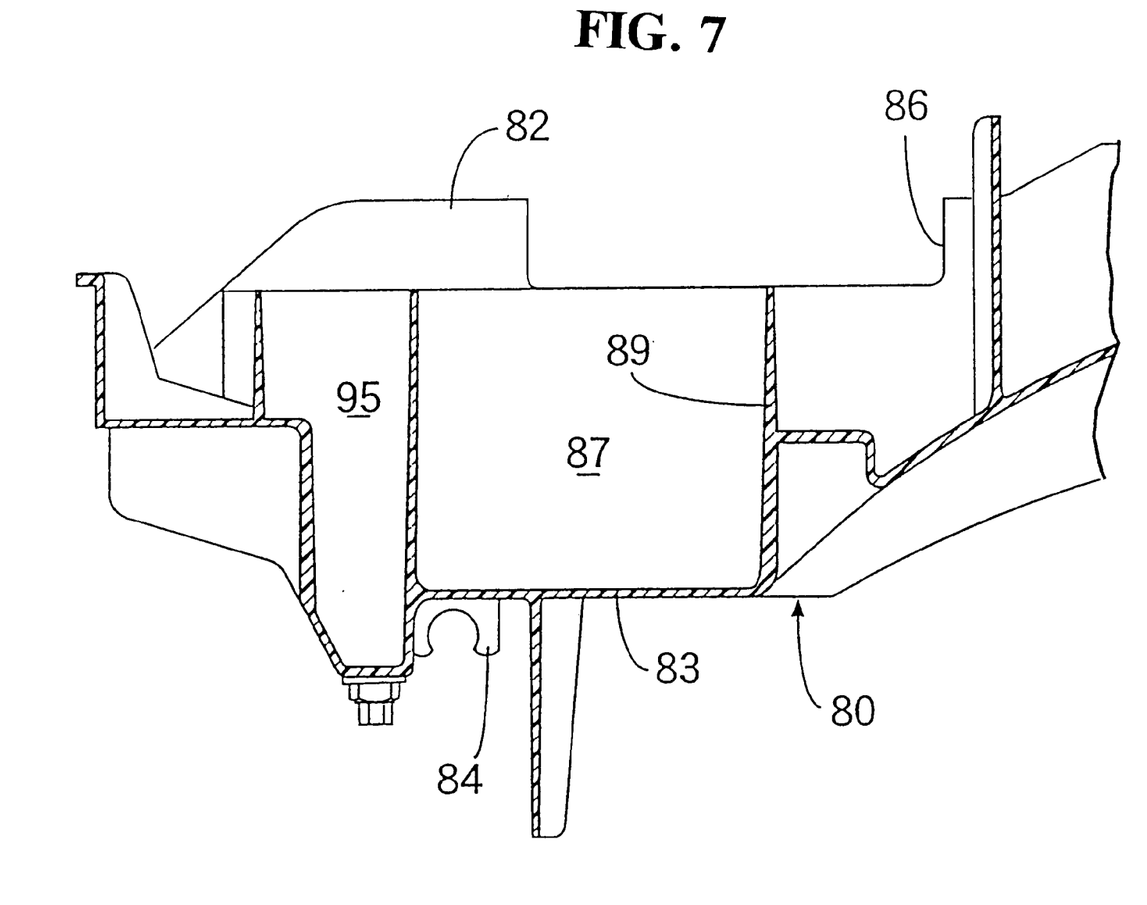
FIG. 7 is a sectional view taken on line 7—7 of FIG. 4, showing the rear fender.

Referring to FIGS. 5 to 7, the rear fender 46 made from a synthetic resin integrally includes a fender main portion 80 disposed over the rear wheel WR and a rearward suspension portion 81 suspended rearwardly, downwardly from the rear end of the fender main portion 80.

The fender main portion 80 includes a pair of right and left side plates 82 vertically extending within the inside of the pair of right and left rear stays 37, and a bottom plate 83 for connecting the lower ends of the side plates 82 to each other. The fender main portion 80 has an approximately U-shaped transverse cross-section opened upwardly as a whole.

A pair of fittingly supporting portions 84 to be elastically fitted, from above, to the first cross-pipe 62, are integrally provided on a portion, near the front end, of the bottom plate 83. Flange portions 85, which project outwardly while being in contact with lower surfaces of the rear stays 37, are integrally provided on the lower ends of portions extending from intermediate portions to the rear ends of the side plates 82. These flange portions 85 have fastening portions 85a to be fastened to the rear stays 37.

By the way, as described above, the rear end portion of the mounting plate 38a of the seat rail 38 and the front end portion of the pipe 38b are bent inwardly in the width direction of the vehicular body, and the rear end portion of the mounting plate 38a is disposed inside the side plate 82. On the other hand, the rear portion of the pipe 38b is disposed outside the side plate 82. A cutout 86 for allowing the front end portion of the pipe 38b which is bent from inside to outside of the side plate 82 to pass therethrough is formed in an upper front portion of the side plate 82.

A battery containing portion 87 for containing a battery 88 (see FIG. 3) is formed in a portion, covered with the main seat 39, of the fender main portion 80 in such a manner as to be spaced inwardly from the side plates 82. The battery containing portion 87 is partitioned by a partition wall 89 raised from the bottom plate 83. The wiring grooves 90 with their upper sides covered with the rear end portions of the mounting plates 38a of the seat rails 38 are formed between the partition wall 89 and the side plates 82.

The front ends of the wiring grooves 90 are opened at the front end of the fender main portion 80, and wire harnesses 91 and 92 (see FIG. 6) are led from the front end opening portions of the wiring grooves 90 to the outside of the rear fender 46 through the wiring grooves 90.

The wire harness 91 to be connected to a rear lamp 93 provided at the rear end of the rear cowl 48 passes through the wiring groove 90 located on the right side as viewed along the forward movement direction of the motorcycle (left side in FIG. 6).

An ECU containing portion 95 for containing an electronic control unit 94 for engine control (see FIG. 3) is formed in a front portion, adjacent to the front end of the battery containing portion 87, of the fender main portion 80.

The function of this embodiment will be described below. Each of the pair of right and left seat rails 38 includes the mounting plate 38a having a flat shape in a side view and extending rearwardly, upwardly and the pipe 38b extending rearwardly, upwardly from the rear end of the mounting plate 38a, wherein the mounting plate 38a is removably mounted to the rear end of the front frame 11, and the pipe 38b tilts more gently than the mounting plate 38a does. The rear frames 12 including the seat rails 38 are removably connected to the rear ends of the front frames 11.

The rear frames 12 including the seat rails 38 can be thus mounted to the front frames 11 in such a manner as to be removable for maintenance and the like. Further, since the connection portions between the seat rails 38 and the front frames 11 are separated forwardly, obliquely downwardly from the rider's main seat 39, these connection portions can be disconnected as needed, and further even if a gap between the right and left connection portions in the width direction of the vehicular body is extended and a tall rider sits on the main seat 39 provided on the seat rails 38, the connection portions do not exert any effect on the riding posture and the resting characteristic of the feet of the rider.

Since the rear end portions of the rear frames 12, composed of the pair of right and left seat rails 38 and the pair of right and left rear stays 37, are formed in such a manner so that the width therebetween becomes narrower toward the rear side, the rear end portions of the rear frames 12 constituting the body frame F in cooperation of the front frames 11 can be, as shown in FIG. 2, made compact in the width direction of the vehicular body. As a result, it is possible to make compact the rear cowl 48 for covering the rear frames 12.

Since the rear stays 37 extend in a straight-line in a side view in such a manner as to tilt more sharply than the pipes 38b as the rear portions of the seat rails 38 do, the rear end portions of the rear frames 12 can be made compact not only in the width direction of the vehicular body but also in the vertical direction. As a result, it is possible to make the rear cowl 48 compact not only in the width direction of the vehicular body but also in the vertical direction.

The rear fender 46 supported by the rear frames 12 includes a fender main portion 80 and a rearward suspension portion 81 suspended rearwardly, downwardly from the rear end of the fender main portion 80. The rear fender 80 integrally includes the pair of right and left side plates 82 and the bottom plate 83 for connecting the lower ends of the side plates 82 to each other. The battery containing portion 87 for containing the battery 88 is formed in the fender main portion 80 in such a manner as to be spaced inwardly from the side plates 82. The rear end portions of the mounting plates 38a of the seat rails 38 are disposed between the battery containing portion 87 and the side plates 82. The pair of right and left wiring grooves 90 with their upper sides covered with the rear end portions of the mounting plates 38a are formed between the battery containing portion 87 and the side plates 82. The wire harnesses 91 and 92 are led from the front end opening portions of the wiring grooves 90 to the outside of the rear fender 46 through the wiring grooves 90.

Since the wiring of the wire harness 91 extending to the rear lamp 93 at the rear end of the motorcycle does not exert any effect on the gap between the seat rails 38 and also a wire harness wiring space is not required to be formed over the seat rails 38, the wire harnesses 91 and 92 can be wired without exerting any effect on the width and height of the main seat 39.

Since the ECU containing portion 95 for containing the electronic control unit 94 for engine control is formed in the fender main portion 80 at the front of the battery containing portion 87, an ECU wire harness to be connected to the electronic control unit 94 is made as short as possible. Further, since it is not required to wire the ECU wire harness while avoiding the battery 88 under the main seat 39, it is possible to narrow the width of the vehicular body under the main seat 39 and to lower the height of the main seat 39.

While the embodiment of the present invention has been described in detail, the present invention is not limited thereto, and it is to be understood that various changes in design may be made without departing from the scope of the claims.

As described above, according to the present invention, since the wiring of the wire harness extending to the rear end of the motorcycle does not exert any effect on the gap between the seat rails and also a wire harness wiring space is not required to be formed over the seat rails, the wire harnesses can be wired without exerting any effect on the width and height of the seat.

According to the present invention, an ECU wire harness to be connected to the electronic control unit is made as short as possible, and further, since it is not required to wire the ECU wire harness while avoiding the battery under the seat, it is possible to make narrow the width of the vehicular body under the seat and to lower the height of the seat.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rear fender adapted for covering a rear wheel of a motorcycle, said rear fender comprising:
   a rear frame including a pair of right and left seat rails for supporting a rider's seat;
   a pair of right and left side plates and a bottom plate for connecting lower ends of said side plates to each other;
   a battery containing portion for containing a battery, said battery containing portion being formed in said rear fender and being spaced inwardly from said side plates, said battery containing portion being covered by said seat;
   a pair of right and left wiring grooves formed in said rear fender at positions adjacent to said battery containing portion and said side plates, said right and left wiring grooves being covered, from above, with portions of said seat rails disposed between said battery containing portion and said side plates; and
   wire harnesses being positioned from front end opening portions of said wiring grooves to the outside of said rear fender through said wiring grooves.

2. The rear fender according to claim 1, wherein an electronic control unit containing portion for containing an electronic control unit for engine control is formed in said rear fender at the front of said battery containing portion.

3. The rear fender according to claim 1, wherein said rear fender and said pair of right and left side plates are integrally joined together.

4. The rear fender according to claim 1, wherein said rear fender includes a main portion being disposed adjacent to a rear wheel of a motorcycle and a rearward suspension portion suspended rearwardly and downwardly for a rear end of the main portion.

5. The rear fender according to claim 1, wherein said right wiring groove is formed between a right side plate and a right partition wall forming a right portion of said battery containing portion.

6. The rear fender according to claim 1, wherein said left wiring groove is formed between a left side plate and a left partition wall forming a left portion of said battery containing portion.

7. The rear fender according to claim 1, and further including a pair of right and left stays being spaced a predetermined distance relative to said pair of right and left seat rails for forming a support for supporting a rider's seat.

8. The rear fender according to claim 7, wherein said pair of right and left stays converge relative to each other as the right and left stays approach the rear of a rider's seat.

9. A rear fender adapted for covering a rear wheel of a motorcycle, said rear fender comprising:
   a rear frame including a pair of right and left seat rails for supporting a rider's seat;
   a pair of right and left side plates and a bottom plate for connecting lower ends of said side plates to each other;
   a battery containing portion for containing a battery, said battery containing portion being formed in said rear fender and being spaced inwardly from said side plates, said battery containing portion being covered by said seat;
   a pair of right and left wiring grooves formed in said rear fender at positions adjacent to said battery containing portion and said side plates, said right and left wiring grooves being covered, from above, with portions of said seat rails disposed between said battery containing portion and said side plates; and
   wherein a wire harnesses is adapted to be positioned from front end opening portions of said wiring grooves to the outside of said rear fender through said wiring grooves.

10. The rear fender according to claim 9, wherein an electronic control unit containing portion for containing an electronic control unit for engine control is formed in said rear fender at the front of said battery containing portion.

11. The rear fender according to claim 9, wherein said rear fender and said pair of right and left side plates are integrally joined together.

12. The rear fender according to claim 9, wherein said rear fender includes a main portion being disposed adjacent to a rear wheel of a motorcycle and a rearward suspension portion suspended rearwardly and downwardly for a rear end of the main portion.

13. The rear fender according to claim 9, wherein said right wiring groove is formed between a right side plate and a right partition wall forming a right portion of said battery containing portion.

14. The rear fender according to claim 9, wherein said left wiring groove is formed between a left side plate and a left partition wall forming a left portion of said battery containing portion.

15. The rear fender according to claim 9, and further including a pair of right and left stays being spaced a predetermined distance relative to said pair of right and left seat rails for forming a support for supporting a rider's seat.

16. The rear fender according to claim 15, wherein said pair of right and left stays converge relative to each other as the right and left stays approach the rear of a rider's seat.

* * * * *